United States Patent [19]

Nordström et al.

[11] 4,079,587
[45] Mar. 21, 1978

[54] MULTI-STAGE TURBINE WITH INTERSTAGE SPACER-MANIFOLD FOR COOLANT FLOW

[75] Inventors: Karl Johan Nordström; Christer Olson, both of Finspong, Sweden

[73] Assignee: Stal-Laval Turbin AB, Finspong, Sweden

[21] Appl. No.: 749,188

[22] Filed: Dec. 9, 1976

[30] Foreign Application Priority Data

Dec. 10, 1975 Sweden .................. 7513892

[51] Int. Cl.² ............................ F02C 3/10; F02C 7/18
[52] U.S. Cl. ............................ 60/39.16 R; 60/39.66; 415/115
[58] Field of Search ............................ 60/39.16, 39.66; 415/115, 116, 117, 112

[56] References Cited

U.S. PATENT DOCUMENTS

| 2,791,090 | 5/1957 | Hooken ........................... 60/39.66 |
| 3,278,294 | 9/1966 | Allen et al. ..................... 415/115 |
| 3,945,758 | 3/1976 | Lee ................................. 415/115 |
| 4,034,558 | 7/1977 | Korta et al. ..................... 60/39.16 R |

Primary Examiner—Carlton R. Croyle
Assistant Examiner—L. J. Casaregola
Attorney, Agent, or Firm—Pollock, Vande Sande & Priddy

[57] ABSTRACT

A multi-stage turbine is provided with spacing pieces between stages which include inwardly extending stays for supporting end-bearings of the adjacent turbine stages. The stays are hollow and surround conduits for cooling air for the turbines and the stays.

8 Claims, 3 Drawing Figures

U.S. Patent  March 21, 1978  4,079,587
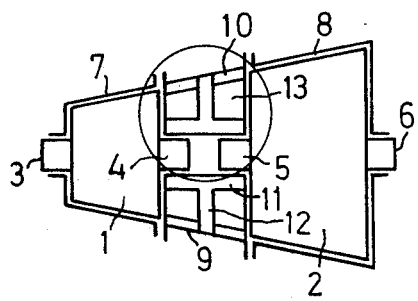
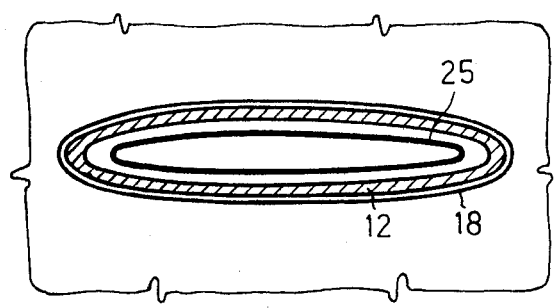
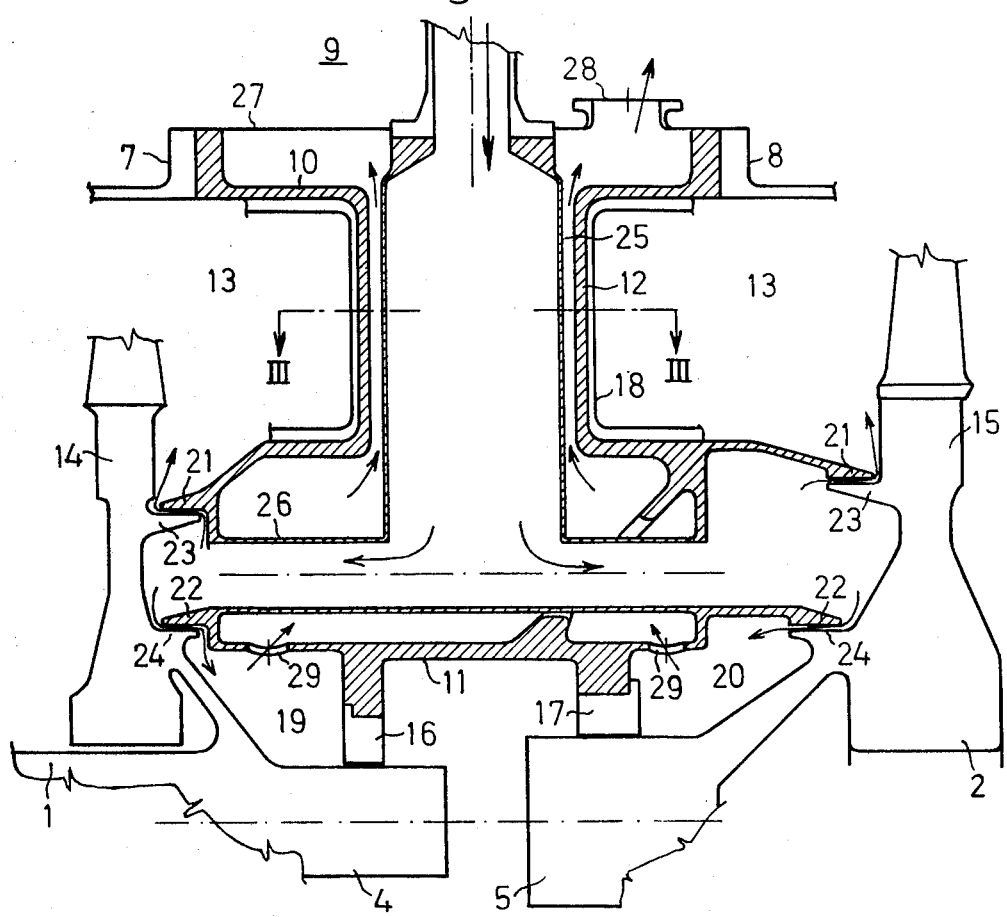

MULTI-STAGE TURBINE WITH INTERSTAGE SPACER-MANIFOLD FOR COOLANT FLOW

BACKGROUND OF THE INVENTION

In two or multi-stage gas turbines known in the prior art, both the central part of the intermediate piece between turbine stages and the outer part of the turbine disks on either side of the intermediate piece are subjected to the heat from the hot gases passing through the device. Efforts have been made to cool the intermediate piece and the ends of the adjacent rotors; however, solutions attempted to date have not been wholly satisfactory.

OBJECTS OF THE INVENTION

An object of the invention is to provide means for cooling the structure between stages of a multi-stage turbine and for cooling the ends of the adjacent turbines.

Another object of the invention is to provide such a device in which cooling air is directed through a hollow spacing piece between turbine stages, without introducing additional flow restrictions in hot gas flow paths between turbine stages.

These objects are given only by way of example. Thus, other desirable objectives and advantages inherently achieved by my invention may occur to those skilled in the art. Nonetheless, the scope of the invention is to be limited only by the appended claims.

SUMMARY OF THE INVENTION

The above objects and other advantages are achieved by the invention, which is particularly suited for use with multi-stage turbines of the type having spacing pieces separating the individual turbine stages and providing end bearings for adjacent turbine stages. The spacing pieces include a plurality of inwardly extending, hollow stays or struts which support the end bearings of the turbine stages. The stays each surround a conduit for cooling air which is directed into a central channel from which it flows into contact with the rotor disks of the adjacent turbine stages. From there, a portion of the air flow passes through a restricted flow path into a hot gas channel passing through the spacing piece; whereas, the remainder of the air flow is returned to the hollow stay and exhausts through the space between the stay and the incoming conduit for cooling air.

BRIEF DESCRIPTION OF THE DRAWING

The invention will be described with reference to the accompanying drawing, in which:

FIG. 1 shows a schematic, section through a two-stage turbine;

FIG. 2 shows on an enlarged scale the encircled portion of FIG. 1, indicating a section through an intermediate piece according to the invention; and FIG. 3 shows a section taken on line III—III in FIG. 2.

DETAILED DESCRIPTION OF THE PREFERRED EMBODIMENT

There follows a detailed description of the preferred embodiments of the invention, reference being had to the drawing in which like reference numerals identify like elements of structure in each of the several Figures.

FIG. 1 shows a two-stage gas turbine with a high pressure stage 1 and a low pressure stage 2. The rotors for stages 1 and 2 are provided with shaft ends 3, 4 and 5, 6, respectively, of which ends 3 and 6 are journalled in the corresponding turbine housings 7 and 8. A spacing piece 9 is provided to support shaft ends 4 and 5, which comprises a mantle 10 and a central part 11 connected by means of hollow, preferably radial stays 12. In the space between mantle 10 and central part 11, an annular gas channel 13 is defined which connects the two stages. The invention is not limited to two-stage turbines, but can be applied to all multi-stage turbines in which two stages are connected by a spacing piece 9.

FIG. 2 shows on an enlarged scale the encircled portion of FIG. 1. Turbine disks 14 and 15 of stages 1 and 2 are located nearest spacing piece 9. The corresponding shaft ends 4 and 5 are journalled in the bearings 16, 17 supported by central part 11. Radial stays 12 of which one is shown in FIG. 2, extend between central part 11 and mantle 10. As shown in FIG. 3, each stay 12 has a streamlined profile in order to interfere as little as possible with flow of the gas stream moving in channel 13. Stay 12 is covered with a heat-insulating layer 18 which also extends over the inside of the mantle 10 and the outside of the central part 11.

Between the turbine disks 14 and 15 and the central part 11 there are restricted flow paths for directing cooling air both outwards towards the gas channel 13 and inwards towards the spaces 19 and 20 at the bearings 16 and 17. These paths are defined by oppositely extending cylindrical flanges 21, 22 on central part 11 and 23, 24 on turbine disks 14, 15 respectively. These flanges form between themselves narrow gaps, possibly with labyrinth profiles (not shown) which control flow of cooling air in a manner to be described.

To cool stays 12, central part 11 and turbine disks 14, 15, each stay 12 is provided with an inner conduit 25 of substantially the same profile as the stay, as illustrated in FIG. 3. The inner end of this conduit passes into a substantially cylindrical, axial conduit 26 which extends in opposite directions towards the turbine disks 14, 15 and terminates between the restricted flow paths previously described. If cooling air is blown through conduit 25, it is divided into two axial streams in conduit 26. These streams then proceed through the gaps between outer flanges 21 and 23 and between inner flanges 22 and 24. The pressure of the cooling air is adjusted so that after the pressure drop experienced between flanges 21 and 23, the pressure is only slightly higher than the pressure in gas channel 13. Thus, the hot gas flowing through channel 13 does not penetrate in towards the turbine shaft. On the other hand, the flow through the gap between flanges 21 and 23 should be limited only to the level necessary for cooling the turbine disk 14, 15.

The cooling air which flows through the gaps between flanges 22 and 24 passes into spaces 19 and 20 defined by bearing housings 16, 17, shaft ends 4, 5 and central part 11. Preferably the pressure in spaces 19, 20 is only slightly higher than atmospheric. Cooling air then passes through hole 29 into the interior of central part 11. From there, passes out into the space between inner conduit 25 and the inside of stay 12 to cool the stay. The cooling air is collected in an annular chamber between mantle 10 of spacing piece 9 and a thin outer mantle 27, from which the cooling air flows out through an opening 28 to exhaust.

It is thus clear that sypply and removal of cooling air takes place through the interior volume of hollow stays 12, which are cooled simultaneously with other parts of spacing piece 9 and turbine disks 14, 15 without requiring the use of additional flow restricting conduits passing through gas channel 13.

Having described our invention in sufficient detail to enable those skilled in the art to make and use it, we claim:

1. A multi-stage turbine, comprising:
   at least one spacing piece separating at least one pair of adjacent turbine stages and providing end bearings for the adjacent turbine stages, said at least one spacing piece having a plurality of hollow, inwardly extending stays for supporting said end bearings;
   a plurality of conduits located within and spaced from said hollow, inwardly extending stays for conducting cooling air for said turbine stages;
   means for directing cooling air from said plurality of conduits into contact with the adjacent turbine stages for cooling the adjacent turbine stages; and
   means for directing cooling air from the adjacent turbine stages through the space between said plurality of conduits and said plurality of hollow, inwardly extending stays for cooling said stays.

2. A multi-stage turbine according to claim 1, wherein said at least one spacing piece and its adjacent turbine stages define an annular flow channel between stages through which annular flow channel said plurality of stays extends; and said means for directing cooling air into contact with the adjacent turbine stages comprises a plurality of channel means extending through said at least one spacing piece, each of said plurality of channel means communicating with a corresponding one of said plurality of conduits, further comprising:
   a first restricted flow path for said cooling air extending between each of said channel means and said means for directing cooling air from the adjacent turbine stages; and
   a second restricted flow path for said cooling air extending between said channel means and said annular flow channel.

3. A multi-stage turbine according to claim 1, wherein each one said plurality of conduits is evenly circumferentially spaced from the interior surface of its corresponding hollow, inwardly extending stay, to provide even cooling of the stay.

4. A multi-stage turbine according to claim 1, wherein each adjacent turbine stage comprises a housing and said at least one spacing piece comprises an outer mantle connecting adjacent turbine housings.

5. A multi-stage turbine according to claim 2, wherein each one said plurality of conduits is evenly circumferentially spaced from the interior surface of its corresponding hollow, inwardly extending stay, to provide even cooling of the stay.

6. A multi-stage turbine according to claim 3, wherein each adjacent turbine stage comprises a housing and said at least one spacing piece comprises an outer mantle connecting adjacent turbine housings.

7. A multi-stage turbine according to claim 5, wherein each adjacent turbine stage comprises a housing and said at least one spacing piece comprises an outer mantle connecting adjacent turbine housings.

8. A multi-stage turbine according to claim 2, wherein said first and second restricted flow paths each comprise pairs of spaced, adjacent, oppositely extending flanges, one flange of each pair attached to said spacing piece and the other flange of each pair attached to said turbine stage.

* * * * *